(12) United States Patent
Chu et al.

(10) Patent No.: US 6,356,913 B1
(45) Date of Patent: Mar. 12, 2002

(54) GENERIC (DATABASE-INDEPENDENT) AND DYNAMICALLY-MODIFIABLE SCHEMA

(75) Inventors: Jeffrey Chu, Arvada; Lei Zhu, Highland Ranch, both of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/328,528

(22) Filed: Jun. 9, 1999

(51) Int. Cl.[7] .............................................. G06F 17/30
(52) U.S. Cl. ................... 707/103 R; 707/102; 707/104; 707/201; 707/2
(58) Field of Search .............................. 707/2, 7, 8, 10, 707/101, 102, 103, 104; 709/201, 223, 240; 345/440; 705/27; 716/5

(56) References Cited

U.S. PATENT DOCUMENTS

| | | | | |
|---|---|---|---|---|
| 5,784,560 A | * | 7/1998 | Kingdon et al. | ............ 709/201 |
| 6,150,062 A | * | 8/2000 | Andrews et al. | ............ 709/223 |
| 6,141,655 A | * | 10/2000 | Johnson et al. | ................ 707/2 |

OTHER PUBLICATIONS

"The Management of Business Transactions through Electronic Contracts" by Alexander Runge et al., Database and Expert Systems Applications, 1999 10 International Workshop, pp. 824–831 (Sep. 1999).*

Database Programming & Design vol: v10 Issue: n8 Pagination: p54(3), Bridging the Data Archipelago (Multidatabase systems, or MDBS, integrate heterogeneous data) (Includes related article on MQSeries and Falcon messaging and queuing middleware) (Technology Information) Davydov, Mark M.; Publication date: Aug., 1997.

* cited by examiner

*Primary Examiner*—Thomas Black
*Assistant Examiner*—Diane Mizrahi
(74) *Attorney, Agent, or Firm*—David Volejnicek

(57) ABSTRACT

A generic and dynamically-modifiable database schema has a tree structure that includes leaf nodes each defining a value of an attribute, branch container nodes each representing a different attribute and identifying those leaf nodes that define values of the container node's attribute, root nodes each representing a database record and identifying those leaf nodes in different container nodes that define values of an attribute of the root node's record, a root container node representing a database and identifying the root nodes that represent its records, attribute nodes each representing a different attribute and identifying the ii branch container node that represents that attribute, and a map container node identifying attribute nodes. Each leaf, root, and attribute node is a data structure that defines a name of an attribute, a value of the named attribute, and an identifier—an index or a dictionary—of zero or more nodes that define values of attributes of the named attribute's value. Attribute nodes lack the value. Each container node is a table, a dictionary, or an array. The schema further includes operations to insert, update, and delete records, and to add and delete attributes.

29 Claims, 9 Drawing Sheets

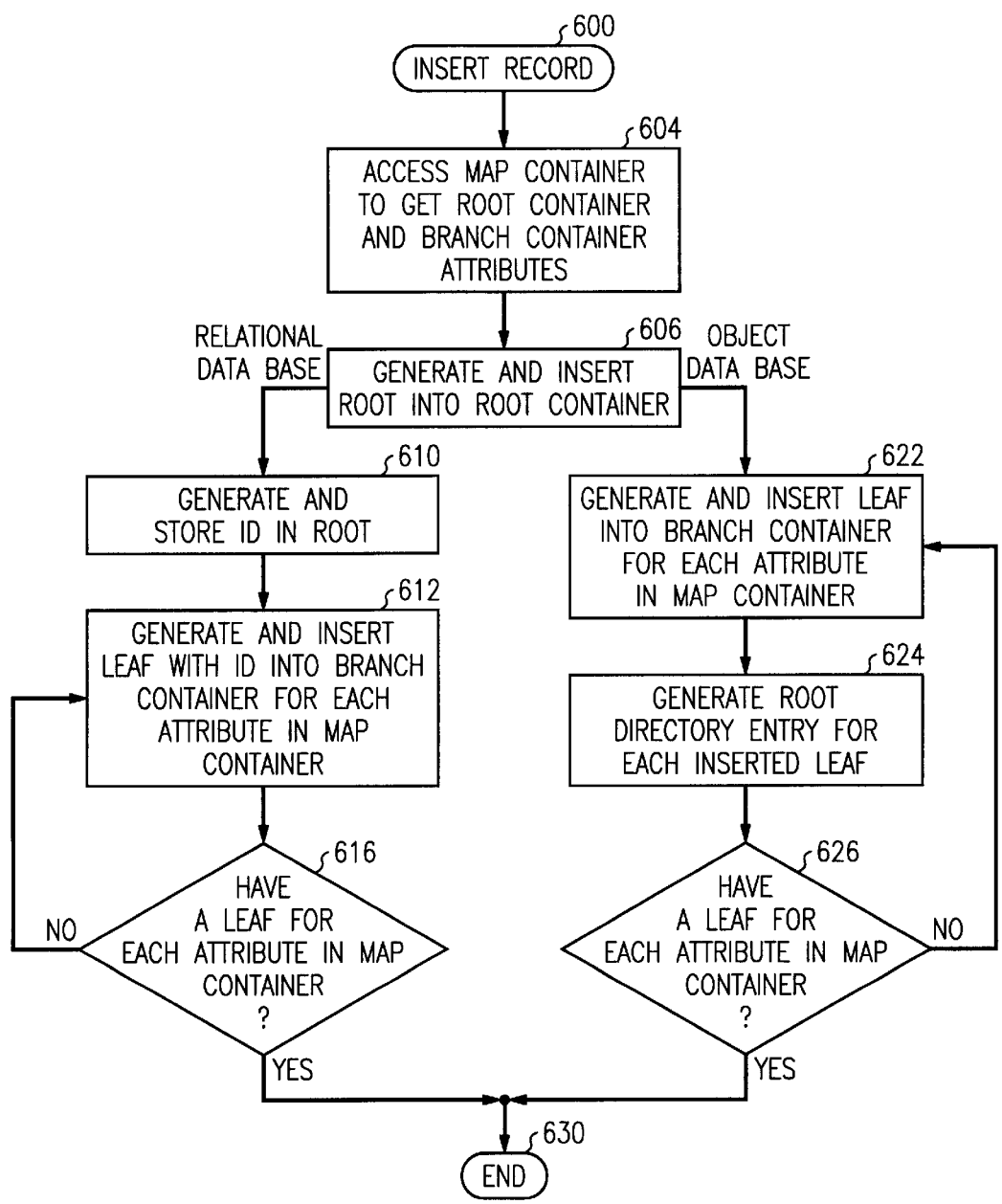

GENERIC (DATABASE-INDEPENDENT) AND DYNAMICALLY-MODIFIABLE SCHEMA

TECHNICAL FIELD

This invention relates to databases in general and to database schema in particular.

BACKGROUND OF THE INVENTION

A database represents a snapshot of the real world at some point in time. As the real world changes over time, so does the database schema, which is a description of the logical structure of the database. For example, engineering design applications require considerable flexibility in dynamically defining and modifying database schema, e.g., class inheritance structure and specifications of attributes and methods requiring application shutdown. This is necessary because design is an incremental process and evolves over time. Schema evolution is the ability to incorporate changes in the database schema while preserving existing information in the database. This is an important issue in a heterogeneous database environment. In such environments, a set of schemata may be used to model the underlying (federated) databases. Changes to one or more databases could result in cascading changes to one or more of the schemata. This in turn could trigger changes to other databases and their schemata. It is therefore very important to manage schema evolution, which includes identifying and propagating changes to the schemata and mapping these back to the set of underlying databases.

Major relational-database vendors support SQL-92 compliant Structured Query Languages (SQLs). In an SQL, schema management is handled by an ALTER TABLE command. The ALTER TABLE command provided by the Microsoft Access database is illustrative thereof:
ALTER TABLE TableName
ADD COLUMN ColName ColType [(size)] [(SingleColumnConstraint] |
DROP COLUMN ColName |
ADD CONSTRAINT [Multi-Column Constraint] |
DROP CONSTRAINT [Multi-ColumnConstraint]
Relational databases store data in strictly tabular format. Consequently, the schema information is primarily stored in the data dictionary. When schema changes occur, the entire table is locked, and the data in each record are modified to meet the new schema. The length of time for which the table is locked depends on the number of records or rows in the table. For a huge table, the schema change process can take hours or even days. Users have to wait for the operation to complete before they can use the table again.

Even though database vendors provide support for schema changes via SQLs, their approaches are typically vendor-specific and only partial. For example, Informix provides a schema evolution approach that appends schema modifications to a list, and these modifications are then accessed and implemented during access of the impacted records. But Oracle requires that the database system be shut down and its tables be changed to reflect any modifications to the schema. And Versant, an object-oriented database, provides a command "sch 2db" to change a schema. Some database-application projects also implement their own approaches to schema changes; one known project uses a high-level approach grafted on to a commercial relational database that uses multiple tables to describe stored data, and involves modifying front mapping tables and altering data tables of corresponding data records. In general, applications developers must write different database records for different vendors' databases or different individual databases. Consequently, application programming is complex and difficult, and the resulting applications are complex, difficult to maintain and upgrade, and not portable between different databases.

SUMMARY OF THE INVENTION

This invention is directed to solving these and other problems and disadvantages of the prior art. Generally according to the invention, there is defined a new database schema that is implementable on most if not all relational and object-oriented databases and that replaces their conventional schemata. This generic schema illustratively uses a tree structure to represent relationships among data attributes, and uses container data structures (nodes) to represent individual attributes (the branches) as collections of all of their instances (leaves) within the tree. All database items use this same one schema, including mapping nodes and root nodes. Hence, the same access and processing procedures can be used on all database items. This schema provides a unified way to handle schema changes independently of the underlying database. When a schema modification happens, a dictionary (in the case of object-oriented databases) or an ID (in the case of relational databases) of a database item is modified, and a container is added or deleted. However, the change is not made at the leaf level, and so the time for which users are locked out from using the database while the change is being effected is minimized. The schema does not require vendor-specific routines, multiple mapping-node modifications, or multiple data-node alterations, to handle schema changes. The solution works across all relational and object-oriented databases known to the inventors. Portability of data among databases is thus facilitated.

Specifically according to the invention, an apparatus comprises a memory that stores a database having a schema that includes the following. A plurality of leaf nodes, each representing an instance (e.g., defining a value) of an attribute. A plurality of branch container nodes, each corresponding to a different attribute and identifying those leaf nodes that represent instances of the container node's attribute. At least one root node, each representing a database record and identifying a leaf node of at least one container node, which leaf node represents an instance of an attribute of the root node's record. A plurality of mapping nodes, each corresponding to a different said attribute and identifying the branch container node that corresponds to said attribute. And a map container node, identifying the plurality of mapping nodes. It preferably also includes a root container node, representing the database and identifying each of the root nodes. Each leaf and root node is represented by a data structure that defines a name of an attribute, an instance (a value) of the named attribute, and an identifier of nodes that represent instances of attributes of the named attribute's instance. Each identification preferably comprises either an Identifier value (in the case of a relational database) or a dictionary of names of the attributes of the named attribute's instance and corresponding pointers that point to the nodes that represent the instances of those attributes of the subject instance (in the case of an object-oriented database). The apparatus preferably further includes instructions stored in the memory for execution by a processor, to cause the processor to modify the schema, for example by adding and/or deleting attributes to or from the schema, and to add records to, delete records from, and/or modify records of, the database.

These and other features and advantages of the invention will become apparent from the following description of an illustrative embodiment of the invention considered together with the drawing.

BRIEF DESCRIPTION OF THE DRAWING

FIG. 6 is a functional flow diagram of an insert record operation of the database of the system of FIG. 1;

DETAILED DESCRIPTION

Figure 1:
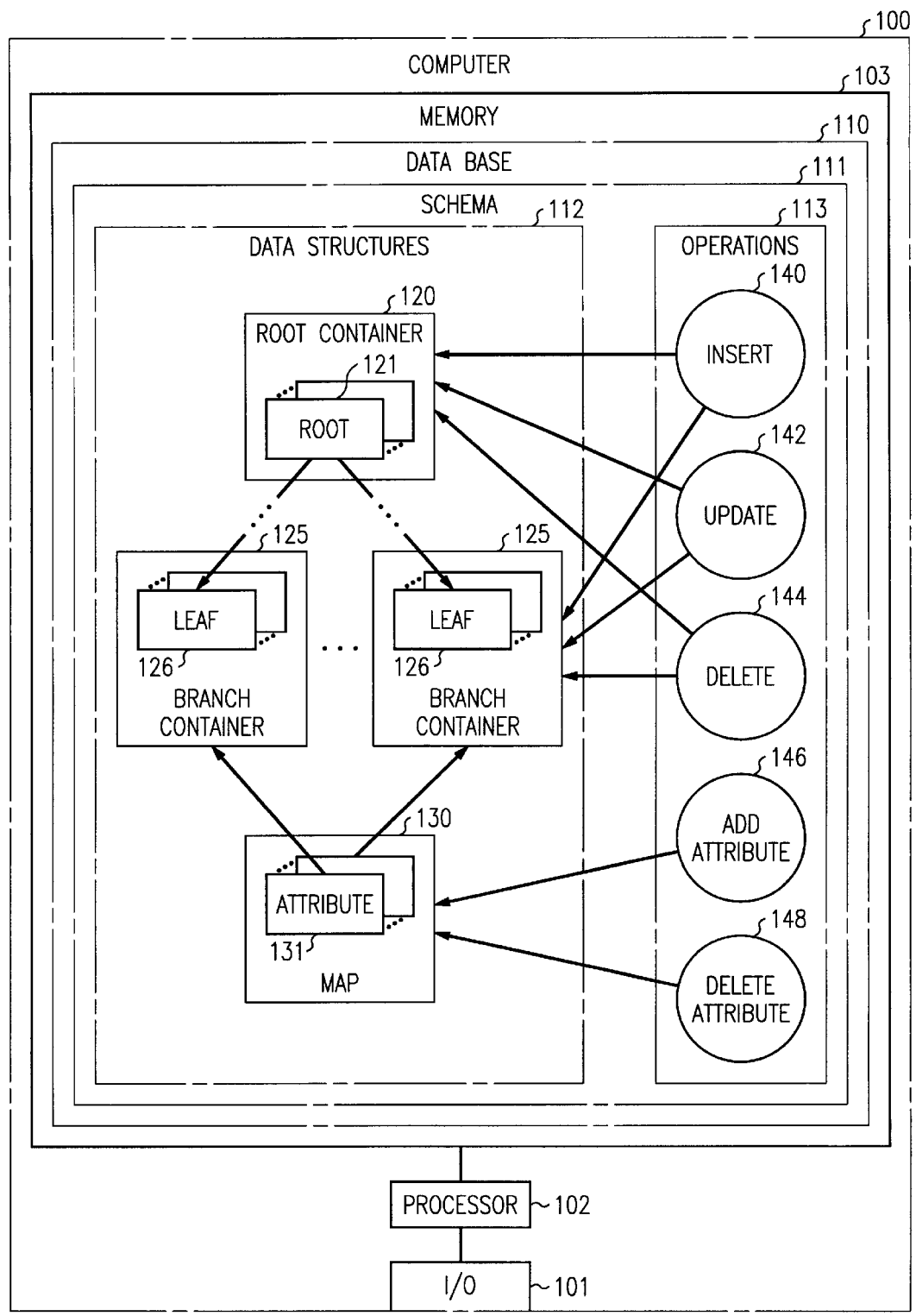
FIG. 1 is a block diagram of a database system that includes an illustrative embodiment of the invention.

FIG. 1 shows a database system implemented in a computer 100. It comprises the conventional computer elements of input and output (I/O) facility 101, such as a display screen keyboard, pointer device, data link, etc., a processor 102, and a memory 103. Implemented in memory 103 is a database 110, for example, a conventional relational or object -oriented database, and its schema 111.

According to the invention, schema 111 is generic to a variety of databases (i.e., it is database-independent) and dynamically changeable. Schema 111 comprises data structures 112 and operations 113 that can be performed on those data structures 112. In the case of an object-orientated database 110, all data structures 112 have the generic form of structure 200 shown in FIG. 2. Each comprises a name-value pair 202,204 where name 202 is an identifier of the attribute (the information type) represented by structure 200 and value 204 is an instance (a value) of this named attribute 202. Each data structure 200 further includes a dictionary (a collection) 206 of one or more name-value pair entries 212 where name 208 is an identifier of an attribute of the named attribute 202 and value 210 is an identifier of (a pointer to) a data structure 200 containing instances (values) of this named attribute 208. If data structure 200 is a container, its value 204 is null and its dictionary entries 212 identify all structures 200 that are instances of its attribute (name 202). Alternatively, a container may take the form of just an array of dictionary 206 entries 212. Containers are provided by the underlying database.

Figure 2:
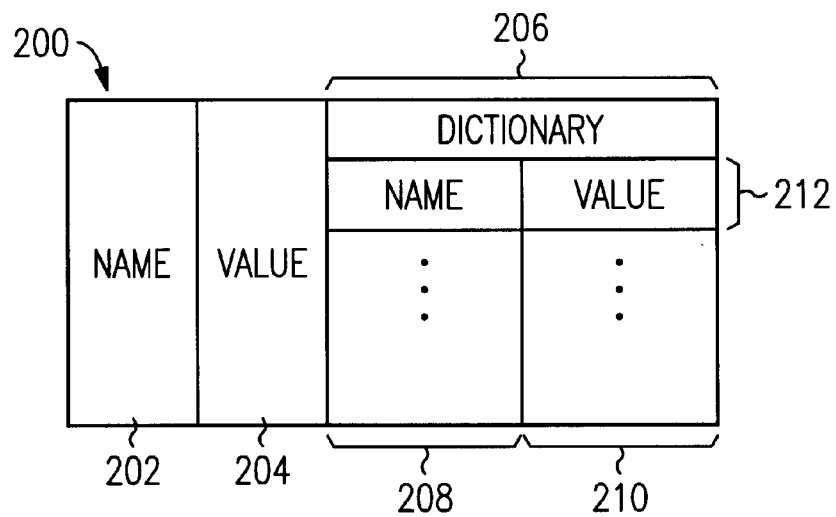
FIG. 2 is a block diagram of illustrative data structures of an object-oriented version of the database of the system of FIG. 1.
Figure 3:
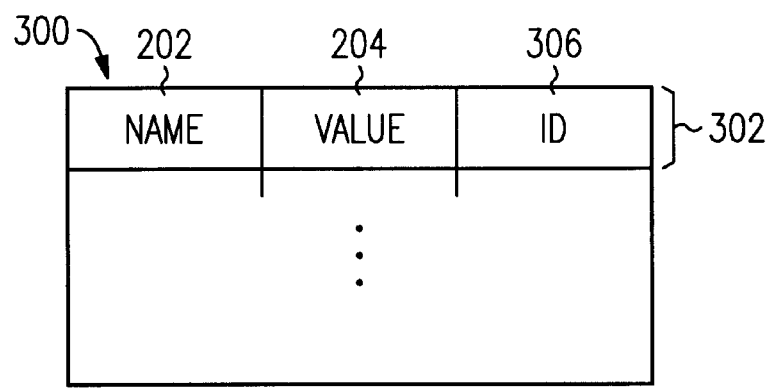
FIG. 3 is a block diagram of illustrative data structures of a relational version of the database of the system of FIG. 1.

In the case of a relational database 110, data structures 112 have the generic forms shown in FIG. 3. Each container structure is a table 300 and represents an attribute. Tables are provided by the underlying database. Table 300 contains as its entries 302 those structures that are instances of the represented attribute. Each instance structure 302 comprises the name-value pair 202, 204 that was described in conjunction with FIG. 2, and an ID (identifier) 306 that identifies entries 302 in other tables 300 that specify its attributes.

Preferably, data structures 200 in FIG. 2 and 302 in FIG. 3 are expanded to include additional fields. For example, they may be expanded to include an indexing string, a pointer to the root data structure, and an object address or record identifier.

Returning to FIG. 1, schema 111 logically takes on the form of an inverse tree. Data structure 120 called a "root container" contains or points to all data structures 121 called "root", which are the highest-level information objects in database 100. Each root 121 represents a separate database record. Each root 121 points to or identifies all data structures 126 called "leaf" that represent its attributes. Each leaf 126 may in turn point to or identify other leafs 126 in like manner—i.e., serve as a root for other leafs 126 (such an intermediate leaf may be referred to as a "branch"). Data structures 125 each referred to as a "branch container" point to or contain all leafs 126 that are instances of the attribute represented by that branch container 125.

In summary, leaves 126 are instances, or values, of attributes; each branch container 125 represents a different attribute and is a collection of leaves 126 that are instances of that attribute; a root 121 represents a database record and identifies leaves 126 in different branch containers 125 that are attributes of its record; and root container 120 is a collection of all roots 121 (a root container represents a database).

In addition, there is a need for a mapping object, to allow manageability and navigation through containers. Accordingly, a container data structure 130 called "map" points to, or is a collection of, all data structures 131 called "attributes" each of which corresponds to a different attribute and points to the root or branch container 121 or 125 that represents this attribute.

Alternatively, schema 112 may contain a plurality of root containers 120 each with its own corresponding map container 130, thereby representing a plurality of databases.

Figure 4:
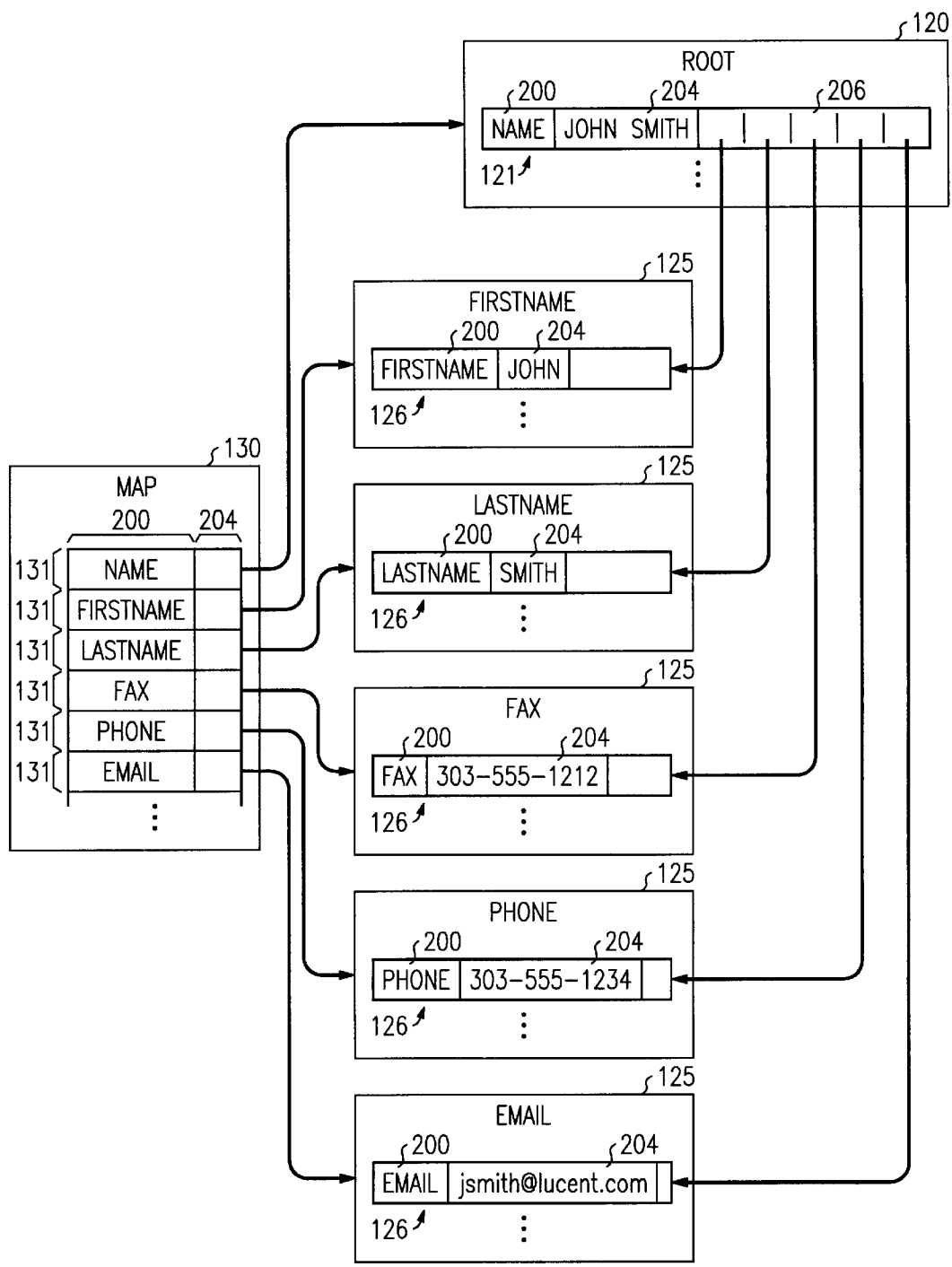
FIG. 4 is a block diagram of an illustrative database record implemented by the data structures of FIG. 2.
Figure 5:
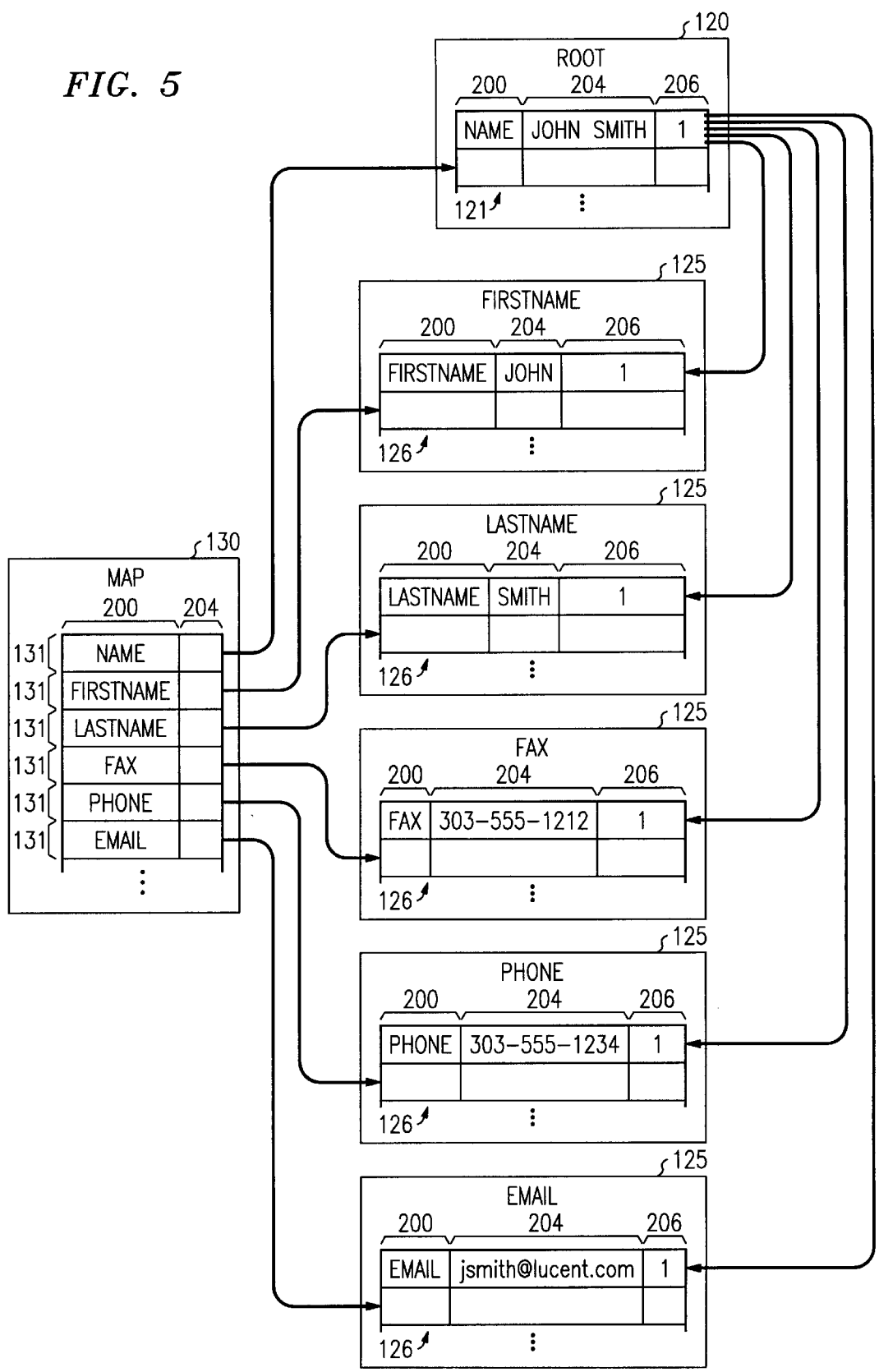
FIG. 5 is a block diagram of the illustrative database record implemented by the data structures of FIG. 3.

FIGS. 4 and 5 show the implementation in schema 111 of illustrative object-oriented and relational databases, respectively, listing the fax and phone number and e-mail address for named individuals.

Turning now to operations 113, they are used to effect changes-both static and dynamic changes to both the data and the schema. Their illustrative implementations are diagramed in FIGS. 6–10. These illustrations assume that the database interface is a multi-threaded server application.

When database 110 is provided with a new database record and an insert record instruction, it performs the insert function 140 shown in FIG. 6. Upon its invocation, at step 600, function 140 accesses map container 130 and gets therefrom attribute 131 that points to root container 120 and attributes 131 that point to branch containers 125, at step 604. Function 140 then generates from the record information, and inserts into the pointed-to root container 120, a root 121 for this record, at step 606. Functionality then diverges slightly depending upon whether database 110 is relational or object-oriented.

If it is relational, function 140 generates and stores an ID 306 in root 121, at step 610. Function 140 then generates from the record information and inserts a leaf 126 containing that ID 300 into branch container 125 for each attribute 131 in map container 130, at step 612. When function 140 has finished doing so, at step 616, it ends its operation, at step 630.

If database 110 is object-oriented, function 140 generates from the record information and inserts a leaf 126 into a branch container 125 for each attribute 131 in map container 130, at step 622, and for each inserted leaf 126 generates an entry 212 in dictionary 206 of the record's root 121. When function 140 has completed this task, as determined at step 626, it ends its operation, at step 630.

Figure 7A:
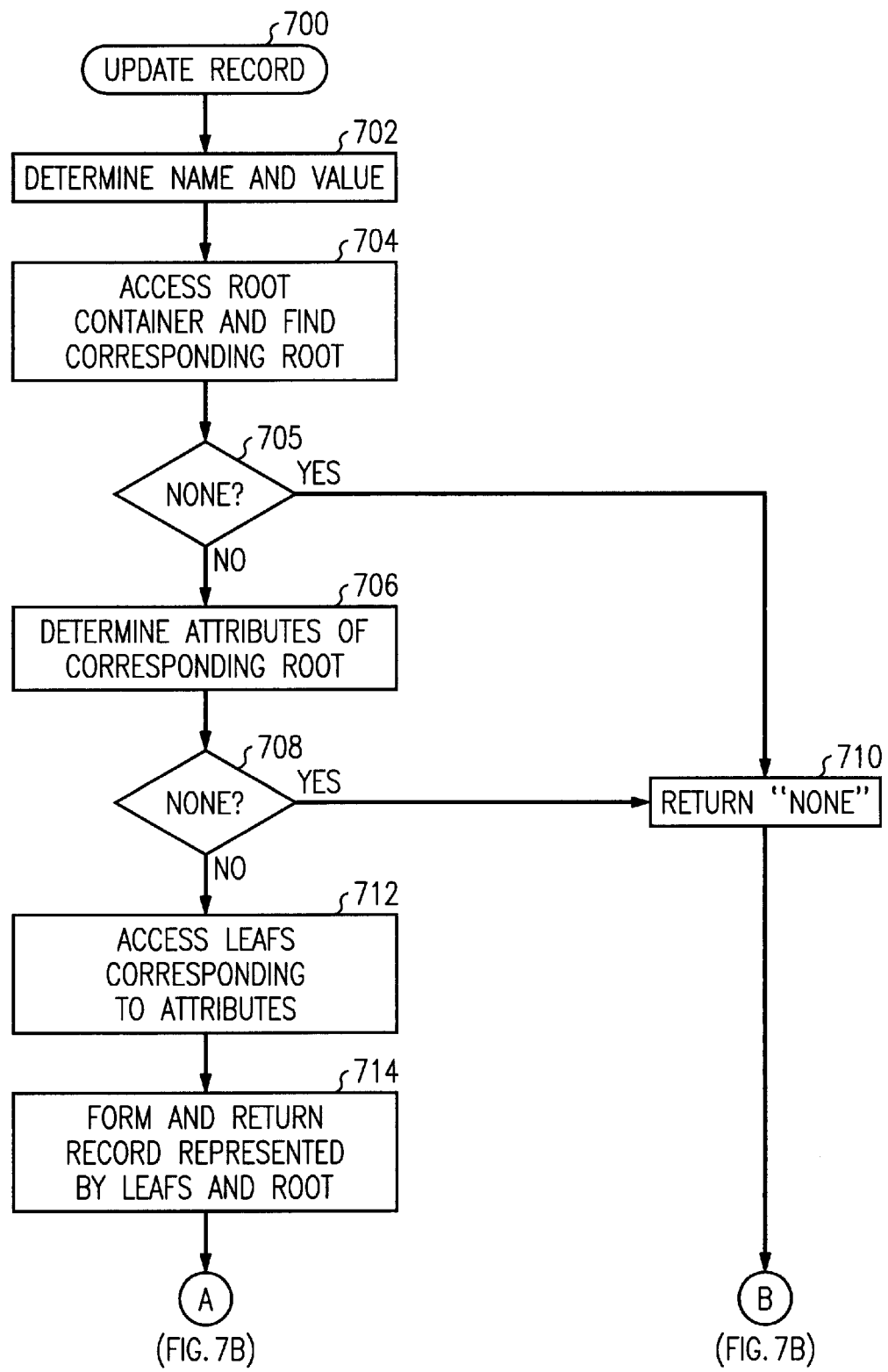
FIGS. 7(A–B) is a functional flow diagram of an update record operation of the database of the system of FIG. 1.
Figure 7B:
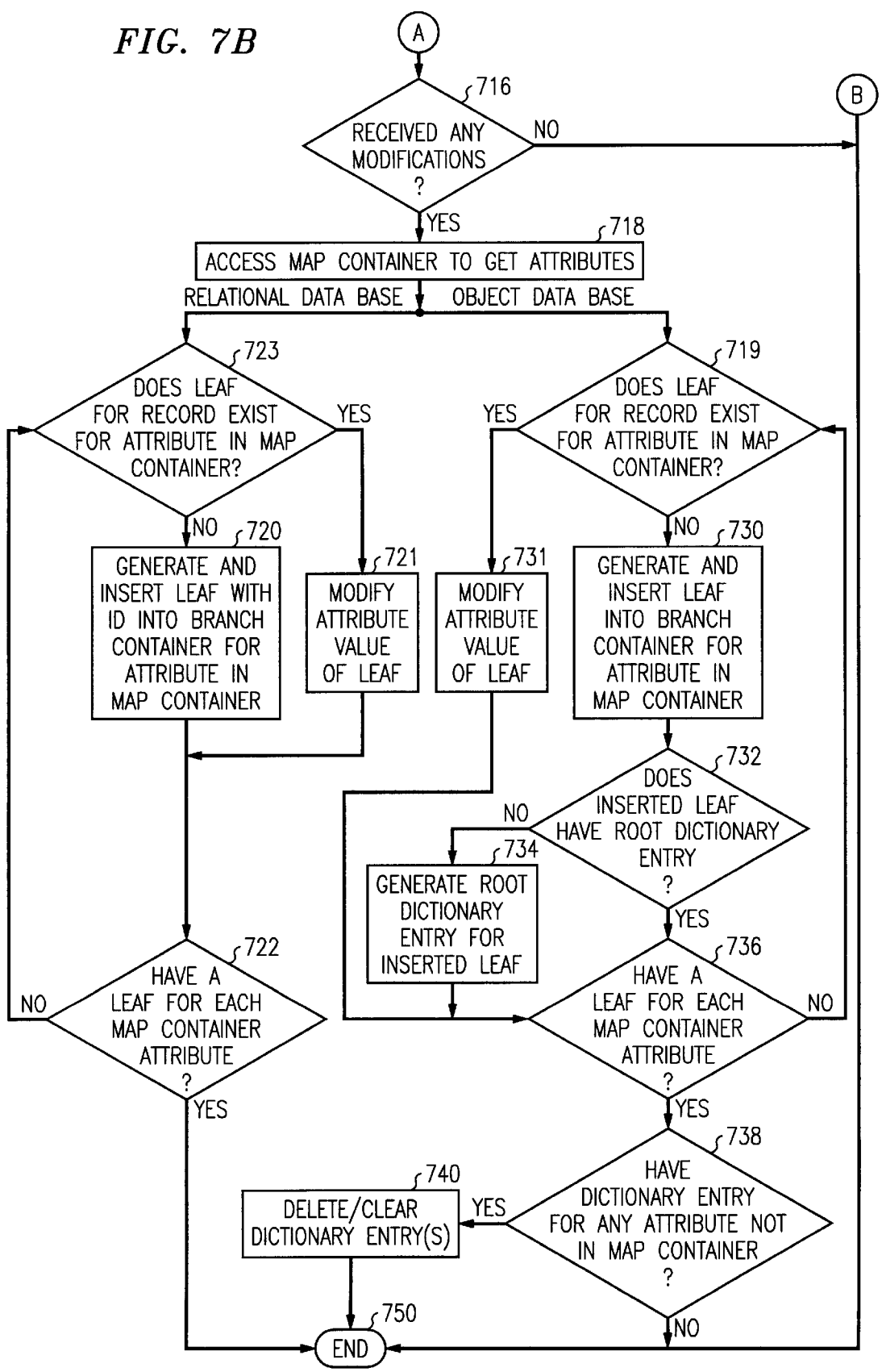

When database 110 is provided with search criteria and an update record instruction, it performs the update function 142 of FIG. 7. Upon its invocation, at step 700, function 142 forms the received search criteria into a name-value pair 202,204, at step 702, which it uses as a search key. Function 142 then accesses root container 130 and uses name-value pair 202,204 to find the corresponding root 121, at step 704. If none is found, as determined at step 705, function 142 so reports, at step 710, and then ends its operation. If a corresponding root 121 is found, function 142 determines the attributes of that root 121, at step 706, either directly from the name, value pairs 212 of the root's dictionary 206, or indirectly from containers 125 having leafs 126 pointed to by ID 306 of the root 121. If no attributes are found, as determined at step 708, function 142 so reports, at step 701, and then ends its operation. If corresponding attributes are found, function 142 uses them to identify and access their corresponding leafs 126, at step 712, and uses leafs 126 and root 121 to form and return to the requestor the record which they represent, at step 714. If modifications to the record are returned to function 142, as determined at step 716, function 142 accesses map container 130 to get attributes 131, at step 718. Further operation diverges slightly depending upon whether database 110 is relational or object-oriented.

If database 110 is relational, function 142 checks if a leaf 126 for the record represented by root 121 (that was found at step 704) exists for each attribute 131 in map container 130, at step 719. If a leaf 126 does not exist for an attribute 131, function 142 generates from the record information and inserts a leaf 126 containing ID 300 of its root 121 into branch container 125 for that attribute 131, at step 720. If a leaf 126 does exist for the attribute, function 142 merely modifies the attribute value 204 of that leaf 126 as necessary, at step 721. When function 142 has finished processing each attribute 131, as determined at step 722, it ends its operation, at step 750.

If database 110 is object-oriented, function 142 checks if a leaf 126 for the record represented by root 121 (that was found at step 704) exists for each attribute 131 in map container 130, at step 729. If a leaf 126 does already exist for an attribute 131, function 142 merely modifies the attribute value 204 of that leaf 126 as necessary, at step 731. If a leaf 126 does not exist for the attribute 131, function 142 generates from the record information and inserts a leaf 126 into a branch container 125 for that attribute 131, at step 730. Function 142 then checks whether dictionary 206 of its root 121 has an entry 212 corresponding to this attribute, at step 732, and if not, generates one, at step 734. When function 142 has completed these tasks, as determined, at step 736, it checks whether dictionary 206 of root 121 has any entries 212 for which there are no attributes 131 in map container 130, at step 738, and if so, deletes or clears those entries 212, at step 740. Function 142 then ends its operation, at step 750.

Figure 8:
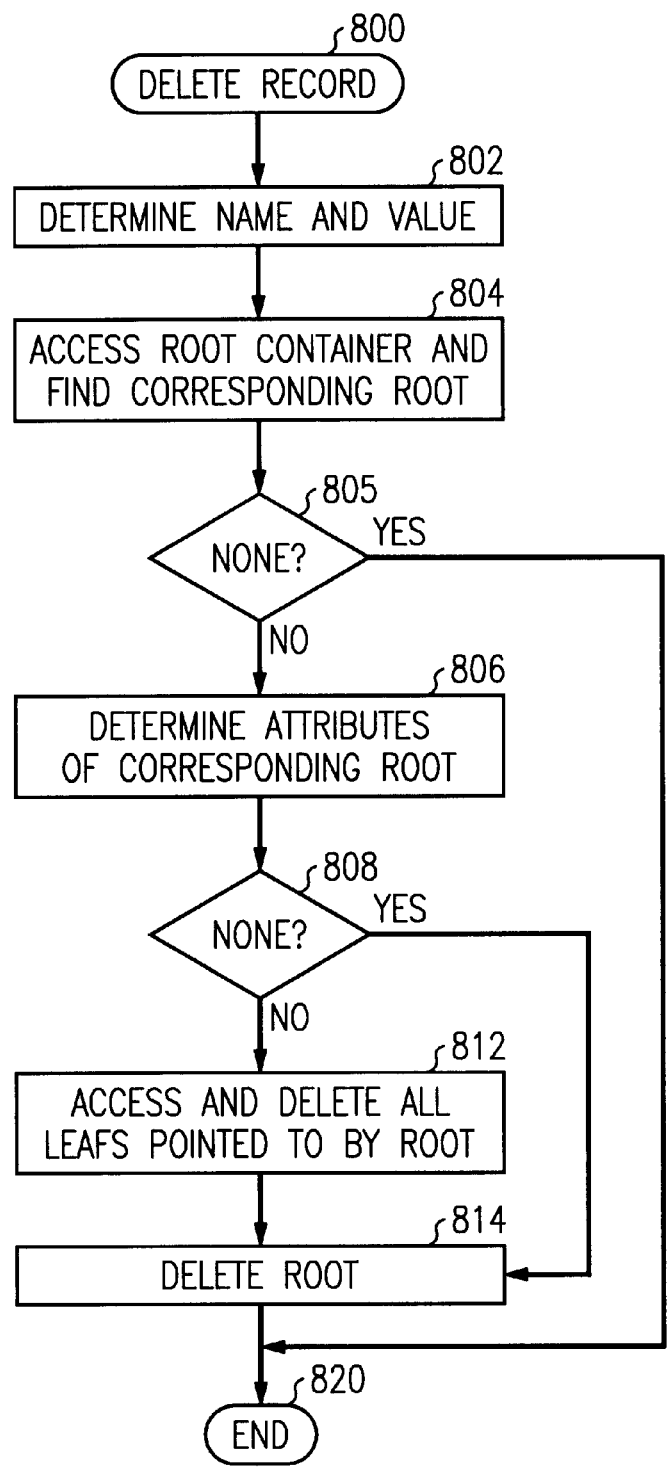
FIG. 8 is a functional flow diagram of a delete record operation of the database of the system of FIG. 1.

When database 110 is provided with search criteria and a delete record instruction, it performs the delete function 144 of FIG. 8. Initially, function 144 proceeds like the update function 142 did at steps 702—702 to identify from the search criteria a corresponding root 121 and its corresponding attributes, at steps 802-808. If a corresponding root 121 is not found, as determined at step 805, function 144 ends its operation, at step 820. If a corresponding root 121 is found in step 804 but no corresponding attributes are found at step 808, function 144 proceeds to step 814. Otherwise, function 144 accesses and deletes all leafs 126 that are pointed to by entries 206 of root 121 found at step 804, at step 812. Function 144 then also deletes that root 121, at step 814, and then ends its operation, at step 820.

Figure 9:
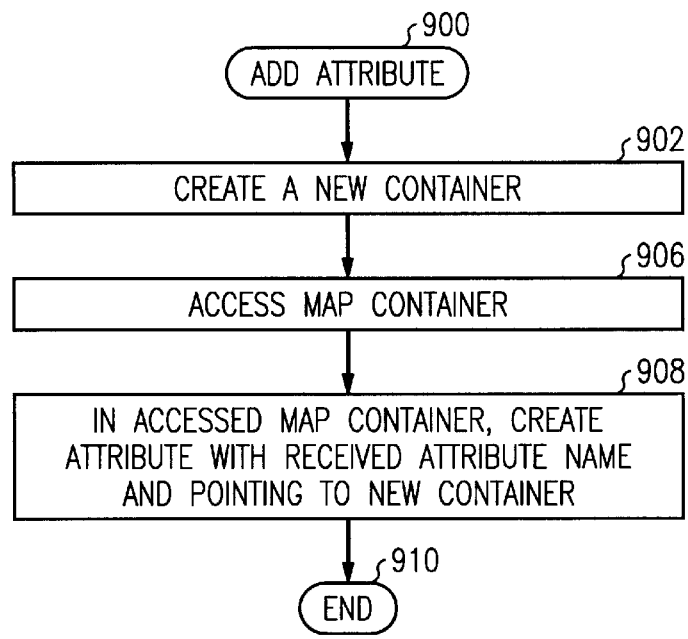
FIG. 9 is a functional flow diagram of an add attribute operation of the database of the system of FIG. 1.

When database 110 is provided with an attribute name and an add attribute instruction, it performs the add attribute function 146 of is FIG. 9. Upon its invocation, at step 900, function 146 causes database 110 to create a new container 125 corresponding to this attribute, at step 902. Function 146 then accesses map container 130, at step 906, and creates therein an attribute 131 with a name 202 that is the received attribute name and a value 204 that points to the new container 125, at step 908. Function 146 then ends its operation, at step 910.

Figure 10:
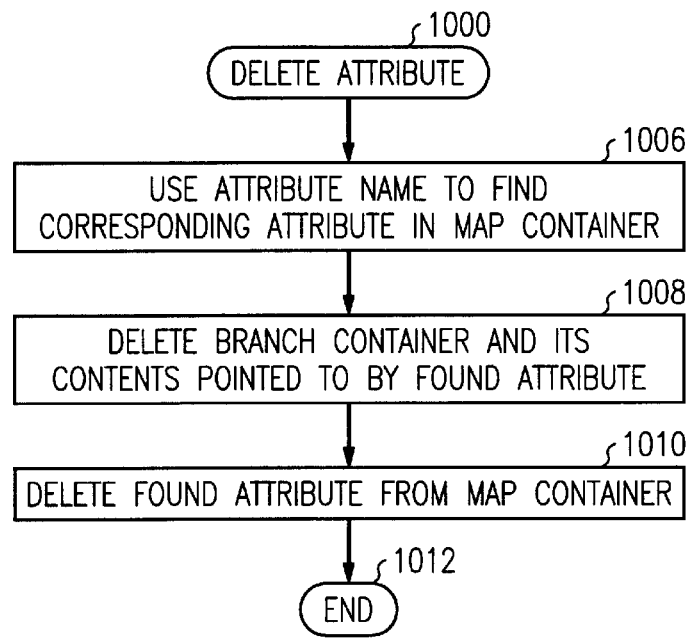
FIG. 10 is a functional flow diagram of a delete attribute operation of the database of the system of FIG. 1.

When database 110 is provided with an attribute name and a delete attribute instruction, it performs the delete attribute function 148 of FIG. 10. Upon its invocation, at step 1000, function 148 accesses map container 130 and uses the received attribute name as a search key to find therein the corresponding attribute 131, at step 1006. Function 148 then deletes branch container 125 that is pointed to by that found attribute 131, including deleting all leaves 126 contained therein, at step 1008. Finally, function 148 deletes that attribute 131 from map container 130, at step 1010, and ends its operation, at step 1012.

Of course, various changes and modifications to the illustrative embodiment described above will be apparent to those skilled in the art. For example, performance may be optimized through indexing to root nodes in the root container. Also, a root pointer can be added to the leaf and branch nodes for referencing back to the root node. Such changes and modifications can be made without departing from the spirit and the scope of the invention and without diminishing its attendant advantages. It is therefore intended that such changes and modifications be covered by the following claims except insofar as limited by the prior art.

What is claimed is:

1. An apparatus comprising:

a memory storing a database having a schema that includes a plurality of leaf nodes each representing an instance of an attribute, a plurality of branch container nodes each corresponding to a different attribute and identifying those leaf nodes that represent instances of the container node's attribute, at least one root node each representing a database record and identifying a leaf node of a least one container node which leaf node represents an instance of an attribute of the root node's database record, a plurality of attribute nodes each corresponding to a different said attribute and identifying the branch container node that corresponds to said attribute, and a map container node identifying the plurality of attribute nodes.

2. The apparatus of claim 1 wherein:

each leaf and root node is represented by a data structure that defines a name of an attribute, and instance of the named attribute, and an identifier of nodes that represent instances of attributes of said instance of the named attribute.

3. The apparatus of claim 2 wherein:

each container node is represented by a data structure that defines a name of an attribute and an identifier of nodes that define instances of the named attribute.

4. The apparatus of claim 3 wherein:

each identifier comprises a dictionary of names of the attributes of said instance of the named attribute and corresponding pointers that point to the nodes that represent the instances of those attributes of said instances.

5. The apparatus of claim 3 wherein:

each identifier comprises a pointer that points to the nodes that define values of the attributes of said instance of the named attribute.

6. The apparatus of claim 3 further comprising:

instructions stored in the memory for execution by a processor to cause the processor to respond to an instruction to modify the schema, by modifying the identifier of at least one leaf or root data structure and adding or deleting both a branch container data structure and a corresponding attribute data structure.

7. The apparatus of claim 2 further comprising:

instructions stored in the memory for execution by a processor to cause the processor to respond to an instruction to modify the schema, by modifying the identifier of at least one leaf or root data structure and adding or deleting a branch container data structure.

8. The apparatus of claim 1 wherein:

each instance of an attribute defines a value of said attribute.

9. The apparatus of claim 1 wherein:

the plurality of leaf nodes include at least one branch node each representing an instance of an attribute that has at least one other attribute and identifying at least one leaf node which represents an instance of at least one other attribute.

10. The apparatus of claim 9 further comprising:

instructions stored in the memory for execution by a processor to cause the processor to respond to an instruction to modify the schema, by adding or deleting a branch container node and causing at least one root node or branch node to identify or cease identifying a leaf node of said branch container.

11. The apparatus of claim 1 further comprising:

a root container node representing the database and identifying each of the root nodes.

12. The apparatus of claim 1 wherein:

each container node is represented by a table, and each leaf, root, and attribute node is represented by an entry in a corresponding table wherein each leaf and root entry defines a name of an attribute, an instance of the named attribute, and an identifier of nodes that define instances of attributes of said instance of the named attribute, and each attribute entry defines a name of an attribute and an identifier of nodes that define instances of the named attribute.

13. The apparatus of claim 12 wherein:

each attribute entry defines the name of the attribute and an identifier of the container table that defines instances of the named attribute.

14. The apparatus of claim 1 wherein:

each node is represented by a data object defining a name of an attribute wherein each container and attribute data object further defines an identifier of nodes that define instances of the named attribute and each leaf and root data object defines an instance of the named attribute and an identifier of nodes that define instances of attributes of said instances of the named attribute.

15. The apparatus of claim 1 further comprising:

instructions stored in the memory for execution by a processor to cause the processor to respond to an instruction to modify the schema, by adding or deleting a branch container node and a corresponding attribute node.

16. The apparatus of claim 1 further comprising:

instructions stored in the memory for execution by a processor to cause the processor to respond to an instruction to insert a record into the database, for accessing the attribute nodes of the map container node to identify the root container node and the branch container nodes, adding a root node for the record to the identified root container node, and adding a leaf node for the record to each of the identified branch container nodes.

17. The apparatus of claim 1 further comprising:

instructions stored in the memory for execution by a processor to cause the processor to respond to an instruction to update a record of the database, for finding the root node of the record in the root container node and determining leaf nodes identified by the found root node, using the found root node and the identified leaf nodes to generate the record, and returning the generated record, and responsive to receipt of modifications to the generated record, for accessing the attribute nodes of the map container node to identify the branch container nodes, modifying the leaf node for the record in each branch container node that has a leaf node for the record, and adding a leaf node for the record to each branch container node that does not have a leaf node for the record.

18. The apparatus of claim 1 further comprising:

instructions stored in the memory for execution by a processor to cause the processor to respond to an instruction to delete a record from the database, for accessing the root node of the record in the root container node and determining leaf nodes identified by the root node, and deleting the root node and the identified leaf nodes.

19. The apparatus for claim 1 further comprising:

instructions stored in the memory for execution by a processor to cause the processor to respond to an instruction to add an attribute to the schema, for creating a branch container node corresponding to the attribute, and adding an attribute node corresponding to the attribute and identifying the created branch container node to the map container node.

20. The apparatus of claim 1 further comprising:

instructions stored in the memory for execution by a processor to cause the processor to respond to an instruction to delete an attribute from the schema, for accessing the attribute node corresponding to the attribute in the map container node, and deleting the leaf nodes identified by the branch container node identified by the attribute node, the branch container node, and the attribute node.

21. An apparatus comprising:

a memory storing a database having a schema that includes a plurality of leaf nodes each defining a name of an attribute and a value of the named attribute, a plurality of branch container nodes each corresponding to a different said attribute and including those leaf nodes that define values of said corresponding attribute, at least one root node each representing a database record, each defining a name and a value of an attribute of the record and identifying a leaf node of at least one container node which leaf node defines a value of an attribute of the value of the attribute of the record, a root container node including the root nodes, a plurality of attribute nodes each corresponding to a different said attribute and pointing to the container node that corresponds to said attribute, and a map container node including the plurality of attribute nodes.

22. The apparatus of claim 21 wherein:

each node comprises a data structure.

23. The apparatus of claim 21 further comprising:

instructions stored in the memory for execution by a processor to cause the processor to respond to an instruction to modify the schema, by modifying node identification effected by at least one leaf or root node and adding or deleting a branch container node and a corresponding attribute node.

24. The apparatus of claim 21 further comprising:

instructions stored in the memory for execution by a processor to cause the processor to respond to an instruction to add an attribute to the schema, for creating a branch container node corresponding to the attribute and adding an attribute node corresponding to the attribute and identifying the created branch container node to the map container node.

25. The apparatus of claim 24 further comprising:

instructions stored in the memory for execution by the processor to cause the processor to respond to an instruction to delete an attribute from the schema, for accessing the attribute node corresponding to the attribute in the map container node, and deleting the leaf nodes identified by the branch container node identified by the attribute node, the branch container node, and the attribute node.

26. The apparatus of claim 25 further comprising:

instructions stored in the memory for execution by the processor to cause the processor to insert a record into the database, for accessing the attribute nodes of the map container node to identify the root container node and the branch container nodes, adding a root node for the record to the identified root container node, and adding a leaf node for the record to each of the identified branch container nodes.

27. The apparatus of claim 26 further comprising:

instructions stored in the memory for execution by the processor to cause the processor to respond to an instruction to delete a record from the database, for accessing the root node of the record in the root container node and determining leaf nodes identified by the root node, and deleting the root node and the identified leaf nodes.

28. The apparatus of claim 27 further comprising:

instructions stored in the memory for execution by the processor to update a record of the database, for accessing the attribute nodes of the map container to identify the container nodes that include nodes for the record, modifying the root node or the leaf nodes for the record in each container node that has a node for the record, and adding a leaf node for the record to each branch container node that does not have a leaf node for the record.

29. The apparatus of claim 28 wherein:

instructions stored in the memory for execution by the processor to cause the processor to respond to an instruction to update a record of the database further include instructions to cause the processor to find the root node of the record in the root container node and determine leaf nodes identified by the found root node, use the found root node and the identified leaf nodes to generate the record, and return the generated record.

\* \* \* \* \*